United States Patent [19]

Schedrovitsky et al.

[11] 4,098,364
[45] Jul. 4, 1978

[54] WEIGHT MEASURING APPARATUS

[75] Inventors: Savely Solomonovich Schedrovitsky; Vladimir Mikhailovich Glebov; Nadezhda Mikhailovna Sidorova; Jury Mikhailovich Dubrovin; Elena Ivanovna Shrubek, all of Moscow; Ivan Semenovich Tarada, Kokchetav; Agnia Alexandrovna Belyaeva, Moscow; Dmitry Matveevich Mash, Moscow; Alexei Pavlovich Lebedev, Moscow; Alexandr Gershevich Belfor, Kiev, all of U.S.S.R.

[73] Assignee: Vsesojuzny Nauchno-Issledovatelsky Institut Stroitelnogo I Dorozhnogo Mashinostroenia, U.S.S.R.

[21] Appl. No.: 732,595

[22] Filed: Oct. 15, 1976

[51] Int. Cl.² .................. G01G 3/14; G01G 23/14; H01F 21/02; H01F 21/06
[52] U.S. Cl. ..................... 177/210 EM; 177/174; 336/30; 336/135
[58] Field of Search ............. 177/210 EM, 174; 336/30, 79, 135

[56] References Cited

U.S. PATENT DOCUMENTS

| 2,431,860 | 12/1947 | Friedlander | 336/135 |
| 2,495,741 | 1/1950 | Labin et al. | 336/79 |
| 3,774,705 | 11/1973 | Muroga | 177/174 X |
| 3,819,025 | 6/1975 | Fushida et al. | 336/135 X |

Primary Examiner—George H. Miller, Jr.
Attorney, Agent, or Firm—Robert E. Burns; Emmanuel J. Lobato; Bruce L. Adams

[57] ABSTRACT

A weight measuring apparatus, wherein a weight sensitive element is connected to a metallic moving member of a weight sensitive element displacement-to-electrical inductive transducer. The moving member is made as a plate positioned in the clearance between two inductance coils of said transducer secured on the casing, their windings being arranged on armour cores. The winding of the first inductance coil is connected to a high-frequency oscillator, whereas the winding of the second inductance coil is electrically connected to a metering circuit. The weight measuring apparatus is characterized by high accuracy of measuring, quick action and high resolution.

2 Claims, 9 Drawing Figures

WEIGHT MEASURING APPARATUS

BACKGROUND OF THE INVENTION

This invention relates to measuring technology and, in particular, to a weight measuring apparatus which is basically employed in processes of automatic dosage measurements and weighing in various branches of industry.

In modern practice development of automatic weighers is directed towards improvement of their design and processing technology, increasing their sensitivity and accuracy of measurements, as well as standardization and normalization of their types and parameters. In this case one of the basic tasks is to provide weight measuring devices featuring a system of remote transmission of data. The main element of such a system is a transducer converting displacements of a weight sensitive element into electrical signals. This system is mounted on some moving part of the weighing scales, e.g. on a beam. It is advisable that these transducers could be installed not only in new weighing equipment but in second hand weighing scales without alterations in their design and unnecessary waste of money.

The main difficulty involved here is the selection of the type of a transducer and matching the working range of the weight scales beam travel and the working range of the moving member of the transducer. This usually requires an intermediate kinematic link and increased accuracy of adjustment, because even insignificant transverse and longitudinal displacements inherent in beam weighing systems result in sharp increase of errors and even jamming.

There are known weighing scales with quadrant or spring balancing. When such weighing scales are used for automatic control they are equipped with potentiometers provided with movable contacts, that is a contact system. Deficiencies of a contact system are commonly known. One of them is insufficient reliability due to existing contact junctions, possible sealing of contacts and their low sensitivity.

There are also known weight measuring apparatuses, wherein the transducer is installed on a metering and balancing mechanism and made as a mag-slip connected to the axis of the pointer of the metering device which moves with respect to the dial face.

Such type of conversion of the pointer angular motion into an electrical signal requires introduction of a receiving selsyn which is to be indentical to the transmitting selsyn and that in general complicates the system of transmission of weighing scales readings.

These weight measuring apparatuses are also deficient in that their resolution is rather low and, consequently, the area of application is limited.

The forementioned weight measuring apparatuses with selsyn remote transmission of readings to obtain a signal to start and stop dosing are provided with contactless discrete pickups interacting with the pointer. For this purpose the pickups are installed on the dial face and the pointer carries plate-screens moving within the pickup response area.

Such positioning of pickups and screens results in considerable additional inertial and frictional load on the pointer axis. There appear slowly damping oscillations of considerable amplitude, which reduce the speed of action of the weight measuring device and distort its readings.

There is also known a weight measuring apparatus comprising an encased weight sensitive element connected to a metallic moving member of a weight sensitive element displacement-to-electric signal transducer, which moves in relation to inductance coils of this transducer secured rigidly on the casing, the winding of the coils is electrically connected to a metering circuit, whereas the winding of the other coil is joined to the power source.

The forementioned apparatus is intended for batch weighing and comprises a weight pan mounted on a leverage which is the weight sensitive element, a metering and balancing device and a weight sensitive element displacement-to-electrical signal inductive transducer.

The forementioned inductive transducer is a differential transformer and the voltage difference in its secondary windings depends on the position of the moving element, that is the position of the armature in relation to the windings, the armature being connected directly to the weight sensitive element.

The drawback of this weight measuring apparatus consists in its insufficient sensitivity and accuracy, which is conditioned by the readings being dependent on uncontrollable mutual motions of the windings of the inductance coils and the armature and caused by the necessity of making the design more complicated and employment of guides.

Besides, in such an apparatus a reverse phenomenon takes place, which consists in the fact that, when the armature moves in the magnetic field of the inductance coils, the resulting electrical interaction brings about a mechanical motive force applied to the armature in the direction opposite to its movement and resisting this movement. Said force is proportional to the current intensity, voltage and distance. That is why its influence has to be reduced at the expense of reducing the output signal, which requires its amplification and employment of complicated secondary equipment, limits the distance between the transducer and the amplifier of the electrical metering circuit and makes the field of application of such weight measuring apparatuses much narrower.

SUMMARY OF THE INVENTION

The object of this invention is to provide a weight measuring apparatus possessing high accuracy of measurements.

Another object of this invention is to increase the reliability of the weight measuring apparatus.

Still another object of this invention is to widen the area of application of the weight measuring apparatus.

In particular, there should be a considerable operational clearance between the inductively connected coils large enough for the uncontrollable (transverse) motions of the transducer moving member not to cause any changes of the output signal. The configuration of the field of the inductively connected coils should be such as to ensure employment of plates with working edges of any specified configuration.

These objects are achieved by that in a weight measuring apparatus comprising an encased weight sensitive element connected to a metallic moving member of a weight sensitive element displacement-to-electric signal inductive transducer, which moves in relation to inductance coils of this transducer rigidly secured to the casing, the winding of one coil being electrically connected to a metering circuit and the winding of the other being joined to the power source, the inductance coils, according to the invention, are provided with armour cores, whereon the windings are arranged with a clearance to each other, the moving member of the weight sensitive element displacement-to-electrical signal inductive transducer is made as plate placed in said clearance and a high frequency oscillator is used as a power source.

It is advisable that in a device comprising a mechanism for weight balancing and metering which axis carries a pointer capable to move with respect to a dial calibrated in weight units and is kinematically connected to the weight sensitive element, the plate of the inductive transducer should, according to the invention, be rigidly secured on the axis of the weight balancing and metering mechanism and have a work edge made in a curve of a radius diminishing from $R_{min}$ to $R_{max}$ within the angle $\alpha$ corresponding to the maximum angle the pointer is able to turn in a specified range.

It is wise that in an apparatus comprising discrete pointer angle pickups electrically connected by means of electric signal counter to some inputs of the weight indicator, its other inputs being electrically connected to the metering circuit, the work edge of the plate of the inductive transducer should, according to the invention, be provided with shortcut portions, their number being equal to the number of subranges and their length being determined by the difference between $R_{max}$ and $R_{min}$ with $\alpha = 0$ for each subrange, and two discrete pointer angle pickups secured on the casing in the same plane as said plate and spaced at an angular distance larger than $\alpha$, interacting with the edge of said plate and designed to define the sign of weight changes.

It is advantageous that in an apparatus comprising discrete pointer angle pickups, equal in number to the number of subranges, electrically connected to the inputs of the weight indicator, its other inputs being electrically connected to the metering circuit, the work edge of the plate of the inductive transducer should, in accordance with the invention, be provided with shortcut portions, equal in number to the number of subrange, their length being determined by the difference between $R_{max}$ and $R_{min}$ when $\alpha = 0$ for each band, and with an additional plate secured on the axis of the mechanism and having a work edge shaped in a curve of a constant radius R, its arc extention corresponding to the angle $\alpha$ to which the main plate is able to turn within one subrange, whereas the discrete pointer angle pickups should be secured in the casing in one plane with the additional plate, being spaced at an angular distance $\alpha$ from one another and interacting with the work edge of said additional plate.

It is also expedient that an apparatus be provided with an additional inductive transducer converting displacements of the weight sensitive element into electrical signals and comprising two inductance coils secured on the casing, their winding being arranged on armour cores with a clearance to each other, and a metallic plate secured on the weight balancing and metering mechanism and positioned in the clearance between the inductance coils of the additional transducer, one of them being connected to the high frequency oscillator and the other being connected to the metering circuit, said plate being provided with a work edge made as a curve of a radius diminishing from $R_{max}$ to $R_{min}$ within the angle $\alpha$ corresponding to the maximum angle the pointer is able to turn in a specified measuring band.

It is advantageous that an apparatus should comprise an additional inductive transducer converting displacements of the weight sensitive element into electrical signals and having two inductance coils secured on the casing, their windings being arranged on armour cores with a clearance to each other, and a metallic plate secured on the axis of the weight balancing and metering mechanism and positioned in the clearance between the inductance coils of the additional transducer, one of these coils being connected to the high frequency oscillator and the other to the metering circuit, the plate being made as a ratchet wheel with a tooth for each band, the edge of each tooth having a portion made as a curve of a radius diminishing from $R_{max}$ to $R_{min}$ and a portion which length is determined by the difference between $R_{max}$ and $R_{min}$ when $\alpha = 0$ for each band.

The proposed weight measuring apparatus ensures local closing of the magnetic circuit of the coils opposing each other producing a concentrated non-scattering magnetic flux, which permits increase of the clearance therebetween (with the high signal level achieved by employment of the high frequency oscillator) and reduction of the level and influence of uncontrollable displacements of the plate in the clearance attained by employment of cores of special configuration.

The proposed transducer used in weight measuring apparatuses permits five or tenfold increase of the output signal with similar reduction in consumed energy as compared to known inductive transducers.

The proposed weight measuring apparatus offers a two or threefold increase in accuracy of weight measuring as compared to other types of weighing devices, whereas the time required for adjustment in operational conditions is cut threefold.

BRIEF DESCRIPTION OF THE DRAWING

This invention will now be described in greater detail with reference to specific embodiments thereof, taken in conjunction with the accompanying drawings, wherein.

DESCRIPTION OF THE PREFERRED EMBODIMENTS

Figure 1:
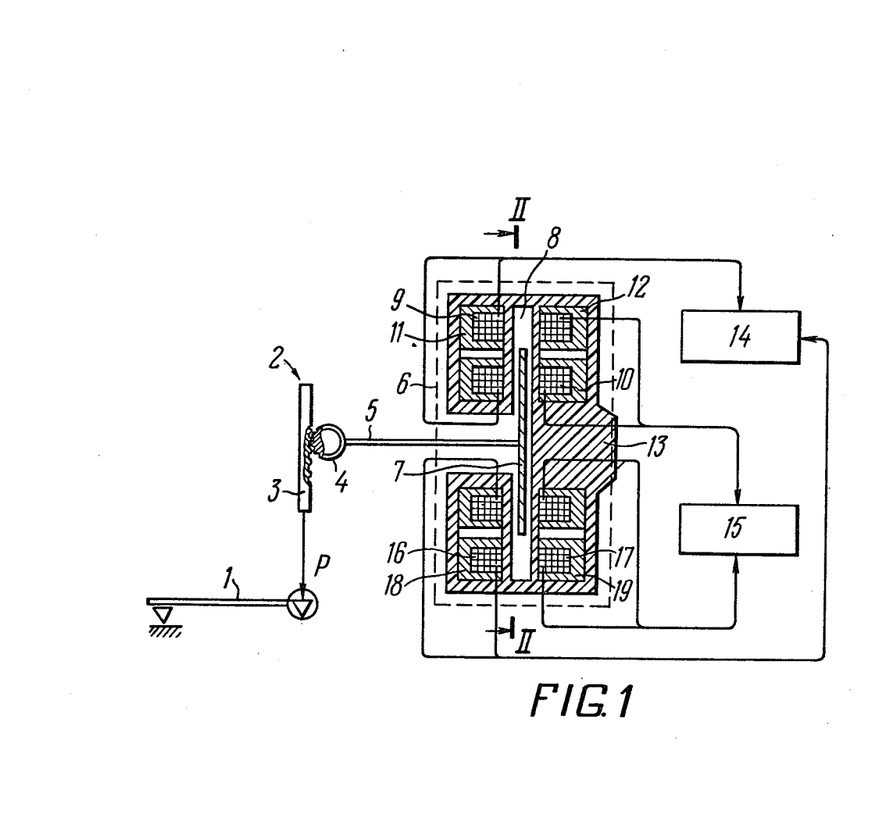
FIG. 1 is a longitudinal section view of a weight sensitive element displacement-to-electrical signal inductive transducer of the proposed weight measuring apparatus, according to the invention.

A first embodiment of the proposed weight measuring apparatus is described by way of example of a beam balance and comprises a weight sensitive element made as a beam 1 (FIG. 1). Alternating motion of the beam 1 is transformed by means of an intermediate member 2, which is in this embodiment a toothed rack 3 engaged with a gear wheel 4, into the rotary motion of an axis 5. A metallic moving member of an inductive transducer 6 converts displacements of the weight sensitive element into electrical signals is secured at the end of the axis 5. The moving member is made as a plate 7 and moves in the clearance 8 formed by two inductance coils of the transducer 6, their windings 9 and 10 being arranged on armour cores 11 and 12 rigidly attached to the casing 13. The winding 9 is connected to a high frequency oscillator, which is in this embodiment a self-exciting generator 14, and the winding 10 is connected to a metering circuit 15.

One more pair of inductance coils is provided in the inductive transducer 6 to increase the sensitivity and accuracy of the measurements. Their windings 16 and 17 are arranged on armour cores 18 and 19 secured on the casing 13 similarly to the cores 11 and 12.

The windings 9 and 16 are primary windings as to their circuit and are connected in series and connected to the self-exciting oscillator 14.

The windings 10 and 17 are secondary windings as to their circuit position, and are connected in series and joined to the metering circuit 15, which is in this embodiment a differential phase-sensitive circuit.

In the described embodiment of the weight measuring apparatus the plate 7 of the inductive transducer 6 has a work edge 20 (FIG. 2) made as a curve of a radius increasing from $R_{min}$ to $R_{max}$ in the angle $\alpha$ proportional to the maximum distance the beam 1 is able to move (FIG. 1). The shape of the plate 7 ensures production of an analog output signal of the transducer 6.

The proposed weight measuring apparatus may have another embodiment described by way of laboratory beam scales, wherein the weight sensitive element is a beam 21 (FIG. 3) and the inductive transducer 6 (FIG. 1) is made similarly to the first embodiment.

Figure 3:
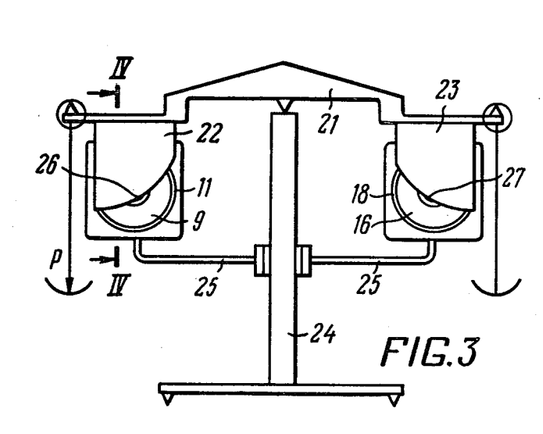
FIG. 3 is a diagrammatic illustration of an embodiment of the proposed weight measuring apparatus exemplified as a laboratory beam scales with secondary inductance coils removed, according to the invention.
Figure 4:
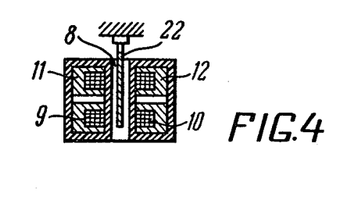
FIG. 4 is a section view taken along line IV—IV of FIG. 3 with the secondary inductance coil, according to the invention.

The only difference of the inductive transducer 6 is that due to the design peculiarities of this type of scales the moving member is made as two alike plates 22 (FIG. 3) and 23 rigidly secured at the opposite arms of the beam 21. Armour cores 11, 18 and 12 (FIG. 1), 19, which are not shown in FIG. 3, are arranged conformably to the position of the plates 22 and 23. The armour cores 11, 12, 18, 19 are attached to the casing 24 by means of brackets 25. The plates 22 and 23 move in the clearance 8 (FIG. 4) between the respective pair of cores 11, 12 and 18 (FIG. 3), 19 (FIG. 1). Work edges 26 (FIG. 3) and 27 of the plates 22 and 23 respectively are shaped so that the degree of screening of the inductance coils and, consequently, the total output signal of the transducer 6 (FIG. 1) are proportional to the weight P being measured.

In the embodiment of the proposed weight measuring apparatus described by way of the beam balance the moving member of the inductive transducer 6 can be made as two plates 22 (FIG. 5) and 23 similar to the ones described above. The plates 22 and 23 are secured each side of a cantilever rod 29 suspended to the weight sensitive element, in this case a beam 28.

Figure 5:
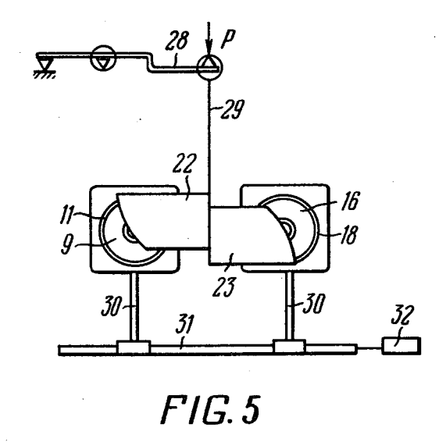
FIG. 5 is a diagrammatic view of an embodiment of the claimed weight measuring apparatus exemplified by a beam balance, according to the invention.

Armour cores 11, 18, and 12 (FIG. 1), 19, which are not shown in FIG. 5, are attached by means of brackets 30 (FIG. 5) on a guide 31 to be moved for zero setting. The cores 11, 18, 12 (FIG. 1) and 19 are moved by an electric drive 32 (FIG. 5).

In this case it is not necessary to install the transducer directly on the weighing scales structural elements and the weight measuring apparatus is equipped with a device called "weight balancing and metering mechanism", the inductive transducer is preferably placed on the elements of this mechanism. As it will be shown lower, such arrangement offers additional advantages by widening the area of application of the proposed apparatus.

It is, therefore, proposed that the claimed weight measuring apparatus comprise a mechanism 33 (FIG. 6) for weight balancing and metering. Its cross-piece 34 is from one end kinematically connected to the weight sensing element, that is the beam 28, and from the other end is connected by means of weight carrying strips 35 to large quadrants 36 which are positioned on one axis 37 with small quadrants 38 and joined to counterweights, that is quadrants 39. The quadrants 39 are levers of the first order on strip supports 40, where the arms of the lever are the quadrants 36 and 38. The axes 37 are joined by a bar 41 connected by means of an intermediate member 42 to a toothed rack 43 engaged with a gear wheel 44 fixed on an axis 45 of the mechanism 33. The alternating motion of the beam 28 is transformed into the rotary motion of the axis 42 and a pointer 46 secured on this axis 45. The pointer 46 moves in the process of measurement with respect to a dial face 47 calibrated in weight units.

The described weight measuring apparatus can also use a spring type weight balancing and metering mechanism.

Figure 2:
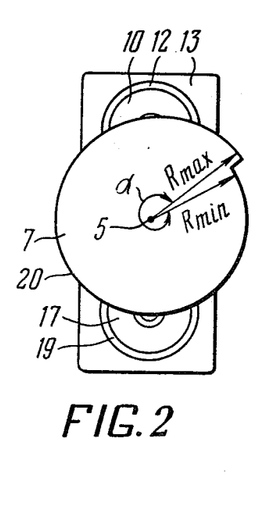
FIG. 2 is a section view taken along line II—II of FIG. 2, according to the invention.
Figure 6:
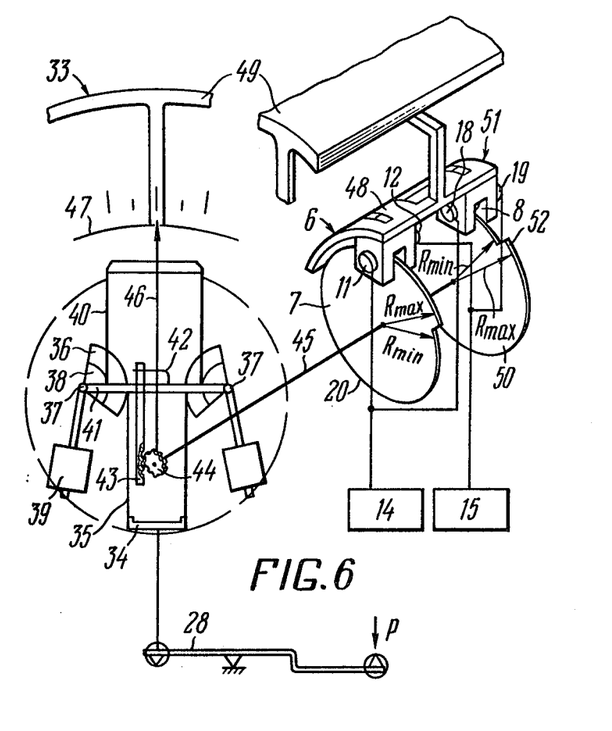
FIG. 6 is a diagrammatic perspective view of an embodiment of the proposed weight measuring apparatus provided with an inductive transducer positioned on the weight balancing and metering mechanism, according to the invention.

Also secured on the axis 45 is a plate 7 of the inductive transducer 6 made similarly to that of FIG. 2. The work edge 20 of the plate 7 is positioned in the clearance 8 between the armour cores 11 and 12 of respective primary and secondary inductance coils attached by means of a bracket 48 on a casing 49 of the mechanism 33.

To increase the level of the output signal of the transducer and, consequently, the accuracy of weight measuring and dosing the proposed weight measuring apparatus is provided with an additional plate 50 secured on the axis 45. Said plate moves in the clearance 8 of the other pair of inductance coils, which armour cores 18 and 19 with the windings 16 (FIG. 1) and 17 are placed similarly to the first pair of cores 11 and 12, forming in combination with the plate 50 (FIG. 6) an additional weight sensitive element displacement-to-electrical signal inductive transducer 51.

A work edge 52 of the plate 50 is made in a curve of diminishing radius from $R_{max}$ to $R_{min}$ in the angle $\alpha$ also corresponding to the maximum angle the pointer 46 can turn within the specified subrange.

The inductance coils of the main and additional transducers 6 and 51 of the described embodiment are similar to that of the first embodiment of the weight measuring apparatus of FIG. 1.

When the plates 7 and 50 move with respect to any point of the dial face 47, the fixed point of the work edge 20 of the plate 7 recedes from the axis 45 of the pointer 46, whereas the respective fixed point of the work 52 of the other plate 50 approaches the axis 45 by the same distance. The degree of screening of the inductance coils alters in this case so that a double signal is produced at the output of the metering circuit 15.

There can be also another embodiment of the weight measuring apparatus, wherein a multistage (multiband) remote transmission of readings. This embodiment is characterized by that the working edge 20 of the plate 7 is made in a curve of a radius growing from $R_{min}$ to $R_{max}$ and is provided with transitional portions 53 (FIG. 7) equal in number to the number of ranges, their length being determined by the difference between $R_{max}$ and $R_{min}$ when $\alpha = 0$ for each range, whereas the length of the edge 20 between two shortcut portions 53 corresponds to the measurement range.

Figure 7:
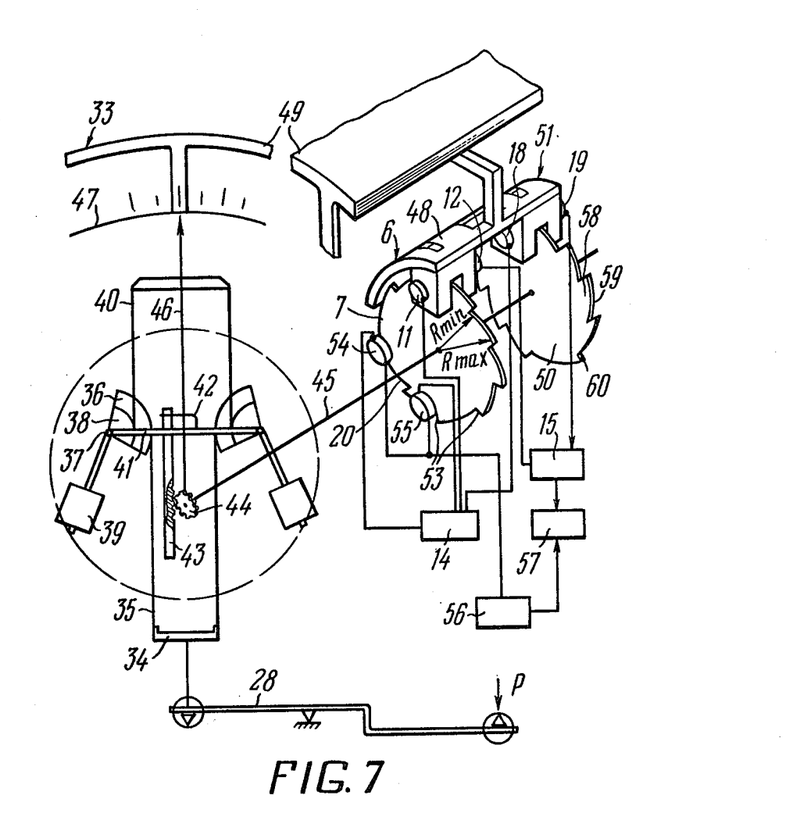
FIG. 7 is a diagrammatic perspective view of an embodiment of the proposed weight measuring apparatus provided with multirange inductive transducer and pickups, which determine the sign of weight change, according to the invention.

Two discrete pickups 54 and 55 are installed in one plane with the plate 7 on the casing 49 of the weight balancing and metering mechanism 33 to determine the direction of rotation of the axis 45 and the plate 7 and, consequently, the sign of weight change. In this embodiment they are contactless generator-type pickups which are in cyclic interaction with the working edge 20 of said plate 7. The pickups 54 and 55 operate at the moment of interaction with the shortent portions 53. In this case to obtain two successive signals from these pickups 54 and 55, their sequence being an indication of the direction where the pointer 46 moves, the pickups 54 and 55 are set up at an angular distance somewhat greater than $\alpha$ within one subrange.

The pickups 54 and 55 are electrically connected by means of the electrical signal counter to the inputs of the weight indicator. In this embodiment a bidirectional electric signal counter 56 and a remote weight indicator 57 are employed. Higher orders of the remote weight indicator 57 are by means of the bidirectional counter 56 electrically connected to the pickups 54 and 55, whereas its lower order is by means of the metering circuit 15 electrically connected to the secondary inductance coils of the transducers 6 and 51. When one of the pickups 54 or 55 operates, the bidirectional counter 56 is switched over to addition or subtraction.

The plate 50 of the additional inductive transducer 51 is made in this embodiment being described as a ratchet wheel provided with teeth 58 equal in number to the number of subranges. The working edge of each tooth within the limits of one subrange has a portion 59 made in a curve of a radius diminishing from $R_{max}$ to $R_{min}$ and a portion 60 which length is determined by the difference between $R_{max}$ and $R_{min}$ with $\alpha = 0$.

In this way the shape of the plate 50 corresponds to the shape of the plate 7, the only difference being that curve radii of their working edges change in opposite directions.

There can be one more embodiment of a weight measuring apparatus similar to that of FIG. 7.

It is different in that there is provided an additional plate 61 (FIG. 8) secured together with the plates 7 and 50 on the axis 45 of the mechanism 33. A working edge 62 of the plate 61 is made in a curve of a constant radius R extending along the arc in accordance with the angle $\alpha$ to which the plates 7 and 50 can turn within one subrange. Discrete pickups 63 indicating the angle of the pointer 46 and equal in number to the number of subranges are positioned in one plane with the plate 61 by being secured on the casing 49 of the mechanism 33 at an angular distance $\alpha$ with respect to one another.

Figure 8:
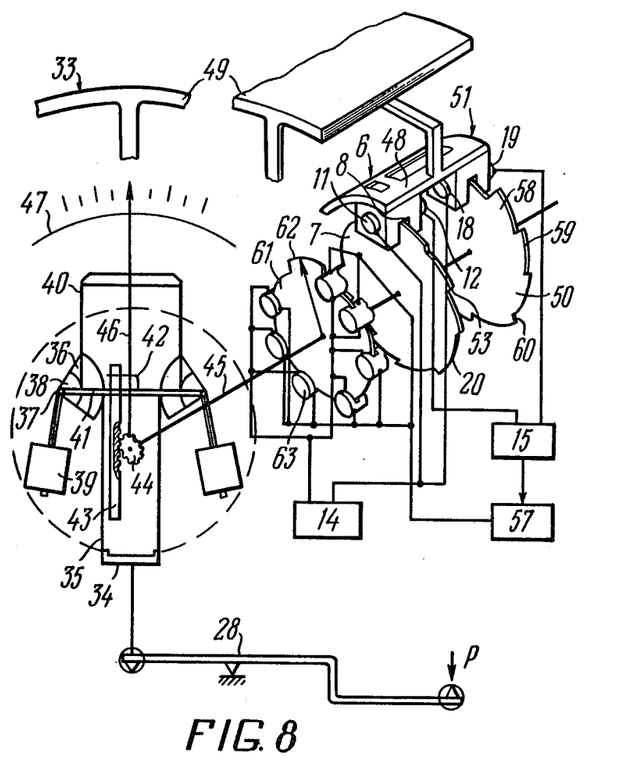
FIG. 8 as a diagrammatic perspective view of the embodiment of FIG. 7 featuring an additional plate and pickups connected directly to corresponding higher levels of the remote weight indicator, according to the invention.

Each of the pickups 63 is directly connected to a respective digit of the high order of the remote indicator 57, whereas the lower order of said indicator 57 is (similarly to the circuit of FIG. 7) electrically connected by means of the metering circuit 15 to the windings 10 (FIG. 1) and 17 of the secondary coils of the inductive transducers 6 and 51 (FIG. 8). The pickups 63 operate when the working edge 62 of the additional plate 61 passes in their operational zone.

The electric circuitry of the self-exciting oscillator 14 of the proposed weight measuring apparatus in all forementioned embodiments comprises a resistor 64 (FIG. 9) and a stabilitron 65 of the first stage of stabilization, a resistor 66 and a stabilitron 67 of the second stage of stabilization, as well as a capacitor 68 which is the filter for alternating voltage of the self-exciting oscillator 14 (any known stabilization circuit can be used to match the requirements of the transducer operational conditions). The self-exciting oscillator 14 uses a tapped capacitor arrangement and is built around a transistor 69 and comprises resistors 70 and 71 as a bias circuit, a resistor 72 included into the circuit of the emitter of the transistor 69 to stabilize current for the transistor 69, and a capacitor 73 shunting the resistor 72 with respect to the alternating current.

The windings 9 and 16 of the primary inductance coils of the transducer 6 are connected in series and included into the circuit of the collector of the transistor 69 (For the transducers 6 and 51 of the embodiments of FIGS. 6, 7 and 8). The windings 9 and 16 in combination with a capacitor 74 connected parallel to the resistor 71 and a capacitor 75 connected into the emitter-collector circuit of the transistor 69 ensure conditions for self-excitation of the self-exciting oscillator 14.

The metering circuit 15 of all the above described embodiments of the weight measuring apparatus is a phase-sensitive detector linked with the windings 10 and 17 of the secondary inductance coils of the transducer 6, said windings being in series and opposing connection, (for the transducers 6 and 51 of the embodiments of FIGS. 6, 7, and 8). The circuit 15 comprises capacitors 76 and 77 which, when connected to the windings 10 and 17, form in combination with these windings a secondary circuit of the self-exciting oscillator, whereas the diodes 78 and 79 connected thereto serve to rectify the alternating current.

Figure 9:
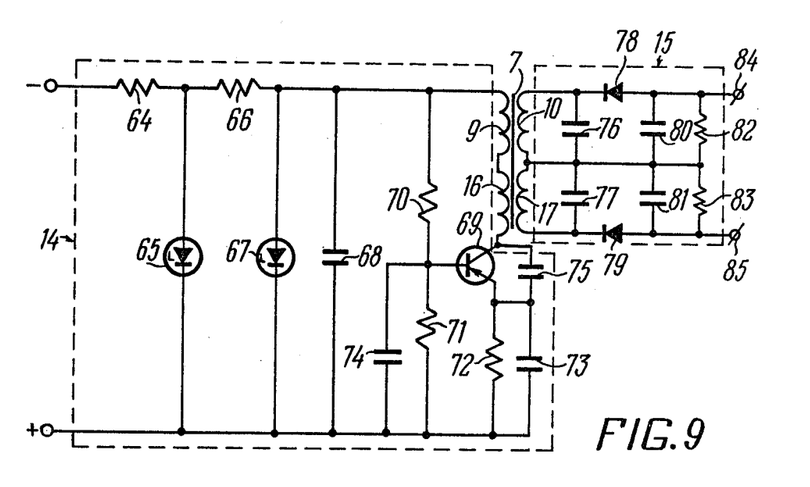
FIG. 9 is a key diagram of a self-exciting oscillator and the metering circuit of the proposed weight measuring apparatus, according to the invention.

Rectification and filtration by capacitors 80 and 81 produces voltages in resistors 82 and 83 which are equal in magnitude (in zero position of the plate 7) and opposite in sign. Thus the potential difference between points 84 and 85 in this state of the transducer 6 (FIG. 1) is equal to zero.

The differential circuitry of the inductance coils permits increase in accuracy of measurements, a twofold gain in sensitivity and ensures zero voltage at the output (zero signal) in the initial position of the inductive transducer 6.

When an output signal of a certain (not zero) level is required owing to conditions of the measuring process involving the inductive transducer 6, one pair of inductance coils featuring windings 9 and 10 can be used as shown in FIGS. 1–5.

All embodiments of the proposed weight measuring apparatus can be classified into two groups: in one group of devices the inductive transducer is positioned directly on the structural elements of a weighing apparatus, whereas in the other group the inductive transducer is placed on the axis of the pointer of the inductive device referred to as "weight balancing and metering mechanism".

Due to forementioned peculiarities the principles of operation of these mechanisms differ only in the method of transmitting the deflection of a weight sensitive element to the moving member of the inductive transducer. In other respects the operation of weight measuring apparatuses is similar for all variations and embodiments.

When feed bars are energized by direct current voltage, the circuit of the self-exciting oscillator 14 (FIG. 9) is excited producing sine-wave voltage in the primary windings 9 and 16. This voltage produces in the secondary windings 10 and 17 voltages which amplitude depends on the controllable movement of the plate 7 kinematically connected to a weight sensitive element, that is the beam 1 (FIG. 1), and, consequently, is the function of weight P.

For weight measuring apparatuses of FIGS. 1-5 the load acting on the beam 1 (FIG. 1) and 28 (FIG. 5) or the beam 21 (FIG. 3) of the weighing device moves the beam, its deflection being proportional to the load. Deflection of the beam 1 (FIG. 1) of the weight sensitive element causes respective displacement of the moving member, that is the plate 7 of the inductive transducer 6 connected thereto. In this case the transducer is of a differential transformer type. The plate 7 acts as a screen which changes as it moves the degree of the inductive connection between the primary and secondary windings 9 and 10 of the transducer 6.

As the plate 7 moves with respect to rigidly attached armour cores 11, 12, 18 and 19 and as the relation between screened areas of the inductance coils changes, different voltages are produced in the secondary windings 10 and 17 to be rectified in the metering circuit 15 by the diodes 78 (FIG. 9) and 79, smoothed by the filter-capacitors 80 and 81 bringing about a potential difference between the points 84 and 85 which is proportional to the voltage difference in the windings 10 and 17.

In this way the signal produced at the output of the metering circuit 15 as an alternating voltage is directly proportional to the weight being measured.

For weight measuring apparatuses shown in FIGS. 6-8 the load acting upon the beam 28 of the weighing device causes its deflection which is transmitted through the use of a kinematic member to the device, that is the weight balancing and metering mechanism 33. Its cross-piece 34 with weight carrying strips 35 transforms this deflection into an angular turn of the quadrants 36 and 38 joined with balancing quadrants 39. When the quadrants 36 and 38 turn, they impart through connecting elements, such as the strip supports 40, the bar 41 and the intermediate member 42, reciprocal motion to the toothed rack 43 engaging the gear wheel 44 which is mounted together with the pointer 46 on the axis 45 of the mechanism 33.

The motion of the toothed rack 43 is transformed into a rotary motion of the gear wheel 44 which in its turn turns the axis 45 with the pointer 46 to a respective angle.

In the embodiments of the weight measuring apparatus of FIGS. 6-8 the moving member, the plate 7 of the inductive transducer 6 is fixed on the axis 45 like the plate 50 of the additional transducer 51.

The working edges 20 and 52 of the plates 7 and 50 are made in a curve of a variable radius: increasing in the first instance and diminishing in the second one.

That is why, when the axis 45 turns to a certain angle proportional to the load value, the plates 7 and 50 turn to the same angle and, due to the opposite direction of changing of the radii of the working edges 20 and 52, the degree of screening of the inductance coils of the transducer 51 is decreased, which results in upsetting the balance, and a double signal is produced at the output of the metering circuit 15, its magnitude being proportional to the weight being measured.

In case of a multirange remote transmission of readings the process of measuring involves apart from the output analog signal taken from the transducers 6 and 51 the signals from two discrete pickups 54 (FIG. 7) and 55 interacting with the plate 7 at the boundaries of measurement subranges. In this case the analog signal of the transducers 6 and 51 is displayed by lower orders of the remote indicator 57, whereas the higher orders of the indicator 57 receive signals via the bidirectional counter 56 switched over to either addition or subtraction from the discrete pickups 54 and 55.

If the load is in excess of the first range, the readings of lower orders of the remote indictor 57 are passed through the analog transducer 6 of the cutout portion 53 of the plate 7 and immediately returned to zero. At the same time the plate 7 interacts with a discrete pickup, e.g. the pickup 55, and the higher order of the indicator 57 displays "one". In the course of further rotation of the plate 7 the process of its interaction with the analog transducer 6 and the discrete pickups 54 is cyclically repeated, the number of ranges being displayed in the higher order of the indicator 57 and the position of the plate 7 within the limits of one range is displayed in lower orders of this indicator 57.

In the embodiment of FIG. 8 each of the discrete pickups 63 is connected to a respective digit of the higher order of the remote indicator 57. The bidirectional counter 56 is not required in this case as well as determination of the direction of rotation of the plate 7, which simplifies the circuitry.

Employment of this invention in weighing dosing devices, including dial scales, permits increase of accuracy and speed of action, makes their design simplier, steps up resolution and significantly widens their field of application.

This invention can provide conditions for integrated automation, particularly of concrete producing plants employing multibrand technology.

What is claimed is:

1. A weight measuring apparatus comprising; a casing; a weight sensitive element positioned in said casing; an inductive transducer converting displacements of said weight sensitive element into electrical signals; a moving member of said inductive transducer comprising a metallic plate connected to said weight sensitive element; two inductance coils of said inductive transducer secured on said casing with a clearance wherein said metallic plate is positioned; armour cores of said inductance coils; windings of said inductance coils arranged on said armour cores; a high frequency oscillator connected to said winding of one of said inductance coils; a metering circuit electrically connected to said winding of said other inductance coil;

a weight balancing and metering mechanism; means defining an axis of said mechanism kinematically connected to said weight sensitive element and whereon said metallic plate is rigidly fastened; a pointer rigidly secured on said axis; a scale calibrated in weight units with respect to which said pointer moves; said metallic plate having a working edge defining a curve of a radius increasing from $R_{min}$ to $R_{max}$ in the angle $\alpha$ corresponding to the maximum angle said pointer can turn within a specified measurement range;

said metallic plate having a working edge provided with cutout portions equal in number to the number of measurement subranges, their length being determined by the difference between $R_{max}$ and $R_{min}$ with the angle $\alpha = 0$ for each subrange; two discrete pointer angle pickups secured on said casing in one plane with said plate and at an angular distance to each other greater than the angle $\alpha$ and interacting with said working edge of said plate to determine the sign of the weight change; a weight indicator having a group of inputs, some of said inputs being electrically connected to said metering circuit; an electric counter connecting said pointer angle pickups to said outputs of said weight indicator;

a second inductive transducer converting displacements of said weight sensitive element into electrical signals; two inductance coils of said second inductive transducer; armour cores of said inductance coils secured on said casing with a clearance relative to each other; windings of said inductance coils arranged on said armour cores, one of said coils being connected to said high frequency oscillator and the other coil being connected to said metering circuit; a metallic plate of said second inductive transducer comprising a ratchet wheel provided with teeth equal in number to the number of measurement subranges and secured on said axis of said weight balancing and metering mechanism and positioned in said clearance between said amour cores of said inductance coils of said second inductive transducer; each said teeth being provided with a working edge and having a portion defining a curve of a radius diminishing from $R_{max}$ to $R_{min}$ and a portion whose length is determined by the difference between $R_{max}$ and $R_{min}$ with the angle $\alpha = 0$ for each subrange.

2. A weight measuring apparatus comprising: a casing; a weight sensitive element positioned in said casing; an inductive transducer converting displacements of said weight sensitive element into electrical signals;

a moving member of said inductive transducer comprising a metallic plate connected to said weight sensitive element; two inductance coils of said inductive transducer secured on said casing with a clearance wherein said metallic plate is positioned; armour cores of said inductance coils; windings of said inductance coils arranged on said armour cores; a high frequency oscillator connected to a winding of one of said inductance coils; a metering circuit electrically connected to said winding of said other inductance coil;

a weight balancing and metering mechanism; means defining an axis of said mechanism kinematically connected to said weight sensitive element and whereon said metallic plate is rigidly fastened; a pointer rigidly secured on said axis; a scale calibrated in weight units with respect to which said pointer moves; said metallic plate having a working edge defining a curve of a radius increasing from $R_{min}$ to $R_{max}$ in an angle $\alpha$ corresponding to the maximum angle said pointer can turn within a specified measurement range;

said metallic plate working edge having cutout portions equal in number to the number of measurement subranges, their length being determined by a difference between $R_{max}$ and $R_{min}$ with angle $\alpha = 0$ for each subrange; a second plate secured on the axis of said mechanism having a working edge defining a curve of a constant radius R, its arc extension corresponding to the angle $\alpha$ to which said metallic plate rotates within the limits of one subrange; discrete pointer angle pickups equal in number to the number of subranges and secured on said casing in a plane with said second plate at an angular distance $\alpha$ from each other and interacting with said working edge of said plate; a weight indicator having a group of inputs, some of said inputs being electrically connected to said metering circuit and other inputs of said group of inputs electrically connected to respective discrete pickups; a second inductive transducer converting displacements of said weight sensitive element into electrical signals; two inductance coils in said second inductive transducer; armour cores of said inductance coils secured on said casing with a clearance to each other; windings of said inductance coils arranged on said armour cores, one of said coils being connected to said high frequency oscillator and the other coil being connected to said metering circuit; a metallic plate of said second inductive transducer defining a ratchet wheel provided with teeth equal in number to the number of subranges and secured on said axis of said weight balancing and metering mechanism and positioned in said clearance between said armour cores of said inductance coils of said second inductive transducer; each of said teeth having a working edge provided with a portion defining a curve of a radius diminishing from $R_{max}$ to $R_{min}$ and a portion whose length is determined by the difference between $R_{max}$ and $R_{min}$ with angle $\alpha = 0\ 0$ for each subrange.

* * * * *